United States Patent
Wang et al.

(10) Patent No.: US 9,628,677 B2
(45) Date of Patent: Apr. 18, 2017

(54) DISPLAY PANEL AND DISPLAY DEVICE

(71) Applicant: BOE TECHNOLOGY GROUP CO., LTD., Beijing (CN)

(72) Inventors: Dongsheng Wang, Beijing (CN); Youmei Dong, Beijing (CN); Mi Zhang, Beijing (CN)

(73) Assignee: BOE TECHNOLOGY GROUP CO., LTD. (CN)

( * ) Notice: Subject to any disclaimer, the term of this patent is extended or adjusted under 35 U.S.C. 154(b) by 26 days.

(21) Appl. No.: 14/098,944

(22) Filed: Dec. 6, 2013

(65) Prior Publication Data
US 2014/0160348 A1 Jun. 12, 2014

(30) Foreign Application Priority Data
Dec. 7, 2012 (CN) .......................... 2012 1 0524611

(51) Int. Cl.
*H04N 5/225* (2006.01)
*G02F 1/1333* (2006.01)
*G02F 1/1362* (2006.01)
*G06F 1/16* (2006.01)

(52) U.S. Cl.
CPC ......... *H04N 5/2252* (2013.01); *G02F 1/1362* (2013.01); *G02F 1/13338* (2013.01); *G06F 1/1605* (2013.01); *G02F 2001/133302* (2013.01); *G02F 2201/56* (2013.01)

(58) Field of Classification Search
CPC .. H04N 5/2258; H04N 5/23293; H04N 7/144; G06F 1/1686
USPC ....................................................... 348/374
See application file for complete search history.

(56) References Cited

U.S. PATENT DOCUMENTS

| 2004/0212555 | A1 | 10/2004 | Falco | |
|---|---|---|---|---|
| 2005/0264689 | A1 | 12/2005 | Yang et al. | |
| 2008/0068484 | A1* | 3/2008 | Nam | H04N 5/23293 348/333.01 |
| 2008/0088734 | A1* | 4/2008 | Huang | G06F 1/1616 348/374 |
| 2008/0137022 | A1* | 6/2008 | Komeno | G02F 1/1337 349/153 |

(Continued)

FOREIGN PATENT DOCUMENTS

| CN | 2842627 | 11/2006 |
|---|---|---|
| CN | 101963711 | 2/2011 |

(Continued)

OTHER PUBLICATIONS

Office Action issued in corresponding Chinese Application No. 2012105246117 dated Apr. 24, 2014.

(Continued)

*Primary Examiner* — Mekonnen Dagnew
(74) *Attorney, Agent, or Firm* — Scarinci Hollenbeck

(57) ABSTRACT

A display panel and a display device comprising an image sensor installed in an installation hole provided in a non-display region of an array substrate and preferably further comprising a camera embedded in the installation hole of the array substrate. By embedding the image sensor in the array substrate of the display panel, the overall thickness of the display panel is reduced which results in a light and thin display panel and simplifies the circuit connection of the whole display panel, thereby reducing the production cost thereof.

16 Claims, 4 Drawing Sheets

(56) References Cited

U.S. PATENT DOCUMENTS

| | | | | |
|---|---|---|---|---|
| 2009/0111512 | A1* | 4/2009 | Demuynck | 455/556.1 |
| 2010/0033647 | A1* | 2/2010 | Okita | H04N 5/2253 349/57 |
| 2010/0110283 | A1* | 5/2010 | Shin | H04N 5/2251 348/374 |
| 2010/0315570 | A1 | 12/2010 | Matthew et al. | |
| 2011/0254758 | A1* | 10/2011 | Lin | G02B 26/001 345/84 |
| 2012/0069241 | A1* | 3/2012 | Shiau | G06F 1/1686 348/373 |
| 2012/0105400 | A1* | 5/2012 | Mathew | H04N 5/2251 345/207 |

FOREIGN PATENT DOCUMENTS

| | | |
|---|---|---|
| CN | 201859605 | 6/2011 |
| CN | 102636896 | 8/2012 |
| CN | 202939916 | 5/2013 |
| KR | 20080024662 | 3/2008 |

OTHER PUBLICATIONS

Office Action issued in corresponding Chinese Application No. 2012105246117 dated Sep. 11, 2014.
Office Action issued in corresponding Chinese Application No. 2012105246117 dated Feb. 9, 2015.
European Search Report issued in corresponding European Application No. 13196020 dated Mar. 27, 2014.
Office Action issued in corresponding Korean Application No. 10-2013-0149004 mailed on Apr. 27, 2015.
Office Action in Korean Patent Application No. 10-2013-0149004, dated Nov. 27, 2015.

\* cited by examiner

E-E

DISPLAY PANEL AND DISPLAY DEVICE

CROSS-REFERENCE TO RELEVANT APPLICATION

The present application claims a priority of the Chinese patent application No. 201210524611.7 filed on Dec. 7, 2012, which is incorporated herein by reference in its entirety.

TECHNICAL FIELD

The present invention relates to the field of display technology, in particular to a display panel and a display device.

BACKGROUND

Flat-panel display is a display device where a ratio of the length of a diagonal of its screen to the overall thickness thereof is greater than 4:1, including liquid crystal display (LCD), plasma display panel (PDP), electroluminescent display (ELD), vacuum fluorescent display (VFD), flat-panel cathode ray tube (CRT) display, light-emitting diode (LED) display, and so on. Flat-panel display has many advantages. It is thin and light and thus portable. It can operate at a low voltage, without any X-ray radiation, flicker or jitter, or static electricity, so it will not harm a human body. Its power consumption is low, so it can be powered by batteries. Most of the flat-panel displays have a life longer than CRTs, and can be widely applied to military and civilian areas. Militarily, the flat panel display may be used in almost all places where a display is required, e.g., in a. C(U3)I system, a communication system (especially a portable communicator), an electronic-warfare system, a missile file control system, and a cockpit for a tank, an aircraft and a space shutter. Flat-panel display, which has developed rapidly in the recent years, is considered as one of the last high technologies in $20^{th}$ century.

Along with the rapid development of the display technology, the flat-panel display with a camera function has been gradually used in our daily life. Currently, when manufacturing the flat-panel display with a camera function, usually an image sensor, positioned outside of an array substrate, is additionally arranged in the fiat-panel display. FIGS. 3 and 4 show an existing flat-panel display with a camera function. In existing flat-panel display with a camera function as shown in FIG. 3, a camera 5' is additionally arranged around an array substrate 1', and in existing flat-panel display with a camera function as shown in FIG. 4, the camera 5' is arranged on the array substrate 1'. However, the additionally arranged image sensor will increase the overall thickness of the flat-panel display and the space occupied by the overall unit thereby, so it is unable to obtain a light and thin flat-panel display. In addition, due to the additional image sensor, the circuit connection for the whole display panel will be complex, and thereby the production cost will be increased.

SUMMARY

The examples of the present invention are to provide a display panel and a display device, so as to obtain a light, thin and low-cost display panel with a camera function.

In one aspect, an example of the present invention provides a display panel, comprising an army substrate and at least one image sensor, wherein a non-display region of the array substrate is provided with an installation hole in which the image sensor is installed.

In another aspect, an example of the present invention further provides a display device comprising the above-mentioned display panel.

The examples of the present invention have the following advantageous effects.

According to the display panel and the display device of the examples of the present invention, the image sensor is installed in the installation hole provided in the non-display region of the array substrate and a camera is embedded in the installation hole of the array substrate. By embedding the image sensor in the array substrate of the display panel, it is able not only to reduce the overall thickness of the display panel, thereby obtain a light and thin display panel, but also to simplify the circuit connection of the whole display panel, thereby reduce the production cost thereof.

BRIEF DESCRIPTION OF THE DRAWINGS

FIG. 4b is a sectional view taken along a line E-E of FIG. 4a.

DETAILED DESCRIPTION

Figure 1:
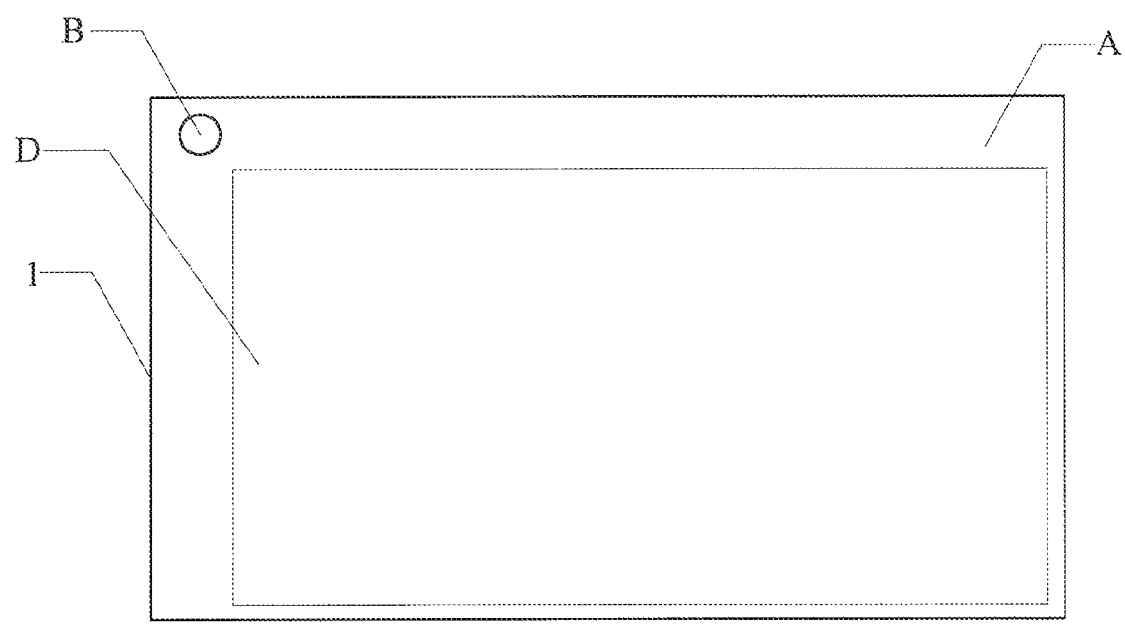
FIG. 1 is a structural schematic view showing a display panel according to one embodiment of the present invention.

The specific embodiments of the display panel and display device will be described hereinafter in conjunction with the drawings.

In the drawings, the thickness and shape of each film is merely for illustrative purpose, but shall not be used to define the real size of the array substrate.

A flat-panel display is thin and light, and thereby it is portable. Based on the flat-panel display technology, the embodiment of the present invention provides a display panel with a camera function. To be specific, the display panel may be a liquid crystal display (LCD), a plasma display panel (PDP), an electroluminescent display (ELD), a vacuum fluorescent display (VFD), a flat-panel cathode ray tube (CRT) display, or a light-emitting diode (LED) display and so on in the specific examples, and this is not limited.

FIG. 1 is a top view showing an array substrate in the display panel according to one embodiment of the present invention. As shown in FIG. 1, the display panel in the embodiment comprises an array substrate 1 including a display region D and a non-display region A, and at least one image sensor (not shown).

The non-display region A of the array substrate 1 is provided with an installation hole B in which the image sensor is installed, the image sensor is embedded in the installation hole B. The image sensor may be a camera, a CCD or a CMOS.

During the implementation, the display panel may include a plurality of image sensors, so a plurality of installation holes B may be provided in the array substrate 1, and one image sensor may be installed in each installation hole B. In addition, each installation hole B may correspond to several image sensors, i.e., several image sensors may be installed in the same installation hole B, and this is not limited.

During the implementation, usually, the image sensor is fixed into the installation hole B via silica gel. A depth and a pore size of the installation hole B may be selected according to the thickness and size of the image sensor embedded in array substrate 1. To be specific, the installation hole B may penetrate through each film and a base of the array substrate 1, i.e., through the overall thickness thereof. Also, it may merely penetrate through the films of the array substrate 1, i.e., through a part of the thickness, and this is not limited. Specifically, when the installation hole B penetrates through the films and the base of the array substrate 1, the overall thickness of the display panel may be further reduced.

Figure 2:
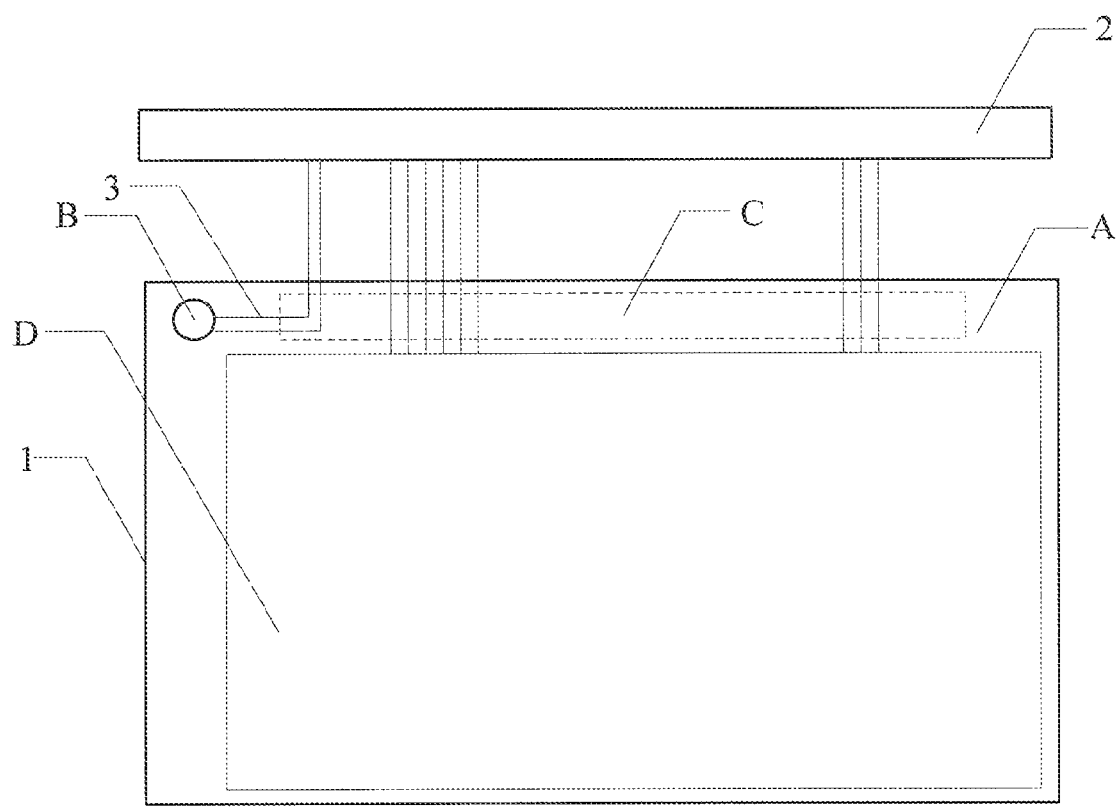
FIG. 2 is a structural schematic view showing the connection of an array substrate with a PCB according to one embodiment of the present invention.
Figure 3:
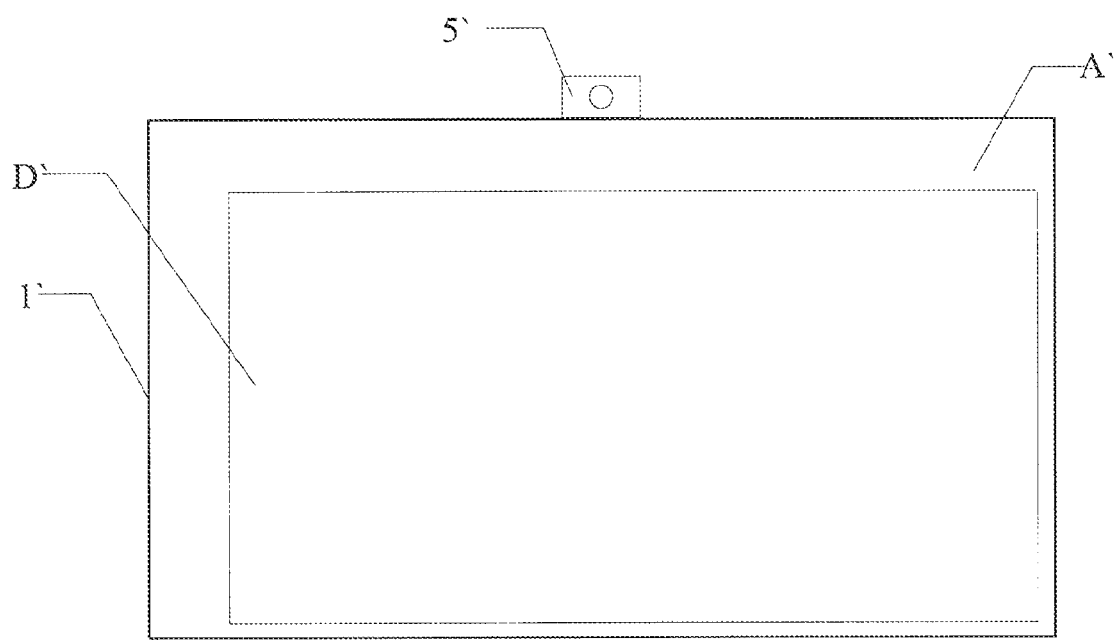
FIG. 3 is a structural schematic view showing an existing flat-panel display with a camera function.
Figure 4A:
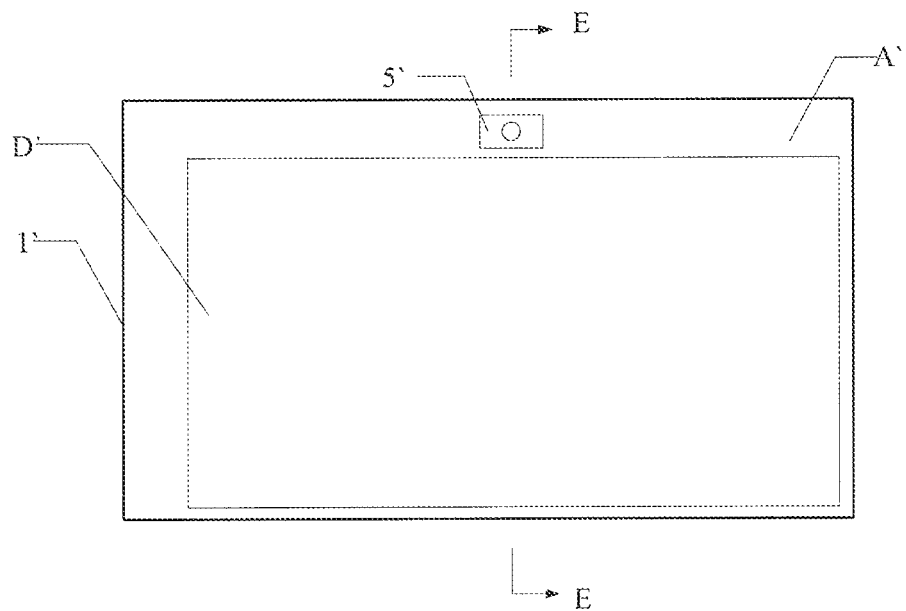
FIG. 4a is another structural schematic view showing an existing flat-panel display with a camera function.
Figure 4B:
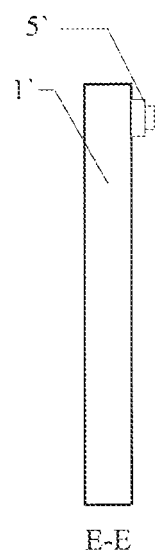

Specifically, in order to ensure normal operation of the image sensor embedded in the array substrate and to further simplify the circuit connection of the whole display panel, a lead 3 may be provided on the array substrate 1 so as to connect the image sensor with a PCB 2. During the implementation, as shown in FIG. 2, the lead 3 for connecting the image sensor with a PCB 2 is arranged between the installation hole B and a joint C of the PCB 2. The lead 3 may include a power supply lead, a data input lead, a data output lead, and so on, and this is not limited.

During the implementation, the lead 3 for connecting the image sensor with a PCB 2 on the array substrate 1 is connected to a lead (not shown) of the image sensor by welding, and the PCB 2 is connected to the lead 3 on the array substrate 1 so as to transmit signals. A camera signal will be transmitted by a signal processor to the image sensor through the PCB 2 and the lead 3 on the array substrate 1. As a result, the image sensor can operate normally.

During the implementation, the lead 3 on the array substrate 1 for connecting the image sensor with a PCB 2 may be arranged on an identical layer to a data signal line on the array substrate 1, i.e., the lead 3 for connecting the image sensor with a PCB 2 and the data signal line and so on may be formed on the array substrate 1 through one layout process. In other words, merely the layout of the data signal line to be made is changed, without adding the process of making the array substrate 1 in whole.

Further, the control function by a slide or a cursor may further be achieved using the image sensor of the display panel in the embodiment of the present invention. The image sensor will collect a track of a moving object, and a movement position of the object will be converted into a coordinate in the display panel according an existing calculation model such as an algorithm for capturing a space object, so as to perform the operations such as moving the cursor. Such a function belongs to the prior art, and thus is not described herein.

Correspondingly, the embodiment of the present invention further provides a display device comprising the above-mentioned display panel. For the implementation of the display device, please refer to the embodiment of the display panel, and it will not be repeated herein.

According to the display panel and the display device of the embodiment of the present invention, the image sensor is installed in the installation hole provided in the non-display region of the array substrate, and a camera is embedded in the installation hole of the array substrate. By embedding the image sensor in the array substrate of the display panel, it is able to not only reduce the overall thickness of the display panel, thereby obtain a light and thin display panel, but also simplify the circuit connection of the whole display panel, thereby reduce the production cost thereof.

It should be noted that, a person skilled in the art may further make improvements and modifications without departing from the principle of the present invention. If these improvements and modifications fall within the scope of the attached claims and equivalents thereof, the present invention is intended to include these improvements and modifications.

What is claimed is:

1. A display panel, comprising:
an array substrate and a plurality of image sensors,
wherein a non-display region of the array substrate is provided with an installation hole in which the plurality of image sensors is installed, and the plurality of image sensors is embedded in the installation hole; and
a plurality of leads, respectively connecting the plurality of image sensors with a PCB and configured to transmit camera signals to the plurality of image sensors via the PCB, are provided on the array substrate, and the plurality of leads is arranged on an identical layer to a data line configured to transmit data signals.

2. The display panel according to claim 1, wherein one image sensor is installed in each installation hole.

3. The display panel according to claim 1, wherein more than one image sensor is installed in each installation hole.

4. The display panel according to claim 1, wherein the installation hole penetrates merely through films of the array substrate and does not penetrate through a base of the array substrate.

5. The display panel according to claim 1, wherein the plurality of image sensors is fixed in the installation hole via silica gel.

6. The display panel according to claim 1, wherein each lead on the array substrate for connecting each image sensor with the PCB is connected to a lead of the each image sensor by welding.

7. The display panel according to claim 1, wherein the display panel is a liquid crystal display (LCD), a plasma display panel (PDP), an electroluminescent display (ELD), a vacuum fluorescent display (VFD), a flat-panel cathode ray tube (CRT) display, or a light-emitting diode (LED) display.

8. The display panel according to claim 1, wherein the data line is independent and different from the plurality of leads.

9. A display device comprising the display panel according to claim 1.

10. The display device according to claim 9, wherein one image sensor is installed in each installation hole.

11. The display device according to claim 9, wherein more than one image sensor is installed in each installation hole.

12. The display device according to claim 9, wherein the installation hole penetrates merely through films of the array substrate and does not penetrate through a base of the array substrate.

13. The display device according to claim 9, wherein the plurality of image sensors is fixed in the installation hole via silica gel.

14. The display device according to claim 9, wherein each lead on the array substrate for connecting each image sensor with the PCB is connected to a lead of the each image sensor by welding.

15. The display device according to claim 9, wherein the display panel is a liquid crystal display (LCD), a plasma display panel (PDP), an electroluminescent display (ELD), a vacuum fluorescent display (VFD), a flat-panel cathode ray tube (CRT) display, or a light-emitting diode (LED) display.

16. A display panel, comprising:
an array substrate and a plurality of image sensors, wherein a non-display region of the array substrate is provided with an installation hole in which the plurality of image sensors is installed, and the plurality of image sensors is embedded in the installation hole; and
a plurality of leads, respectively connecting the plurality of image sensors with a PCB and configured to transmit camera signals to the plurality of image sensors via the PCB, are provided on the array substrate, and the plurality of leads is arranged on an identical layer to data lines configured to transmit data signals to respective pixels of the array substrate.

* * * * *